United States Patent [19]

Brennen et al.

[11] 4,234,842

[45] Nov. 18, 1980

[54] VOLTAGE REGULATOR AND FLICKER COMPENSATOR

[75] Inventors: Michael B. Brennen, Wilkins Township, Allegheny County; Laszlo Gyugyi, Penn Hills, both of Pa.

[73] Assignee: Westinghouse Electric Corp., Pittsburgh, Pa.

[21] Appl. No.: 892,556

[22] Filed: Apr. 3, 1978

[51] Int. Cl.³ .............................................. H02J 3/18
[52] U.S. Cl. ...................................... 323/119; 328/144
[58] Field of Search ................. 323/93, 101, 102, 108, 323/119; 328/160, 144

[56] References Cited

U.S. PATENT DOCUMENTS

| | | | |
|---|---|---|---|
| 3,113,274 | 12/1963 | Utt | 328/144 |
| 3,936,727 | 2/1976 | Kelley et al. | 323/102 |
| 3,959,720 | 5/1976 | Bose et al. | 323/119 X |
| 3,961,257 | 6/1976 | Milkovic | 328/160 |
| 3,988,684 | 10/1976 | Müller et al. | 323/93 |
| 3,999,117 | 12/1976 | Gyugyi et al. | 323/119 |
| 4,000,455 | 12/1976 | Gyugyi et al. | 323/119 |
| 4,039,897 | 8/1977 | Dragoset | 328/160 X |
| 4,041,370 | 8/1977 | Schröder | 323/119 X |
| 4,143,315 | 3/1979 | Kelley | 323/119 X |

OTHER PUBLICATIONS

Harashima et al., "A closed-loop control system for the reduction of reactive power required by electronic converters", IEEE transactions on industrial electronics & control instrumentation, vol. IECI-23, No. 2, pp. 162-166, May 1976, 56144 0209H.

Primary Examiner—A. D. Pellinen
Attorney, Agent, or Firm—M. J. Moran

[57] ABSTRACT

A voltage regulator and flicker compensator is taught which utilizes a simulated light bulb in the feedback control. The simulated light bulb utilizes an analog voltage squaring module the output of which is filtered to reduce the second harmonic of the input signal. An error generator is provided as part of the control loop. The error generator utilizes an adaptive voltage reference which tends to conserve VAR generator capacity. A voltage preconditioner is also utilized which reduces spurious non-flicker transients and the like in the feedback signal.

9 Claims, 6 Drawing Figures

VOLTAGE REGULATOR AND FLICKER COMPENSATOR

CROSS-REFERENCE TO RELATED APPLICATIONS

The subject matter of this invention is related to certain other inventions described in concurrently filed copending applications: Ser. No. 892,805 entitled "Static VAR Generator With Non-Linear Frequency Dependent Dynamic Gain Adjuster"; and Ser. No. 892,804, now U.S. Pat. No. 4,188,573, entitled "Static VAR Generator With Time-Related Error Minimizer".

BACKGROUND OF THE INVENTION

The subject matter of this invention relates generally to voltage regulator circuits and relates more specifically to the static VAR generator flicker control type voltage regulator. Static VAR generators, whether used as voltage regulators or flicker compensators, compensate for the effects of voltage change on the terminals of an AC electrical system. The flicker compensator typically is utilized where the load supplied by the AC system varies widely from half cycle to half cycle in a generally unpredictable manner. Two well-known types of loads which cause this effect are electric arc furnaces and electric saw mill motors. The word "flicker" derives from the effect that the widely varying loads have on the light bulbs of unregulated or uncompensated circuits which are connected to the same power supply line as the varying load. The static VAR generator or flicker compensator includes a control circuit which measures the magnitude of arc furnace currents in consecutive half cycles of the line or supply voltage. The measured information is used to compute necessary compensating currents in terms of required firing angle signals for the thyristors of the static VAR generators. The static VAR generator output therefore, can be adjusted once during each half cycle per phase. Generally, a great area of interest in the art of static VAR generators is concerned with apparatus and method for determining the proper firing angle for the inductor control thyristors of the VAR generator. Examples of this can be found in U.S. Pat. No. 3,936,727, issued Feb. 3, 1976 to F. W. Kelly, Jr., and G. R. Lezan, which teaches a compensation control device which determines firing time for a static switch in accordance with the magnitude of the reactive load current and which additionally teaches a regulating means which controls the firing time to maintain the line current and line voltage at a selected line location in substantial phase coincidence. Furthermore, U.S. Pat. No. 3,999,117, issued Dec. 21, 1976 to Gyugyi et al, teaches a static VAR generator and compensator where time delayed firing angles are calculated from integrating furnace load currents over prescribed intervals during real time to thus maintain balance load current at specified phase angles. Other patents in this area include U.S. Pat. No. 4,000,455 issued Dec. 28, 1976 to Gyugyi et al; U.S. Pat. No. 4,068,159, by Gyugyi et al; and U.S. Pat. No. 4,172,234 also by Gyugyi et al. In the past, most of the emphasis has been placed on utilizing load current to determine the time at which compensating reactive power is applied to a system to be regulated or compensated. These circuits utilize a thyristor controlled inductor. The operation of the thyristor controlled inductor is well known. As the firing or pulse delay angle ($\alpha$) is increased, the current in the inductor decreases. The total current drawn from the network is the difference between a fixed capacitor current, where the capacitor is connected in parallel with the combination of the thyristor and the inductor, and the variable inductor current. This effect can produce leading or lagging reactive power depending on the relative size of the inductor and capacitor. It would be advantageous if an AC voltage regulating loop which is related to the magnitudes of the line to line voltages could be provided for utilization in calculating thyristor control angles $\alpha$. Furthermore, it would be advantageous if the closed loop voltage control system could utilize apparatus therein which was essentially fast and utilized linear-acting rather than second or third order control elements. It would also be advantageous if the compensator or regulator could effectively control flicker without necessarily effecting relatively slow changes in line voltage which are generally tolerable. The conventional method of obtaining the error of an AC voltage feedback signal is by full wave rectification of the line voltage and the consequent subtraction of the rectified signal from a DC reference signal. The resulting error signal, $\Delta V$, consists of an average value and a superimposed rectifier ripple which contains harmonics in a well-known composition. The useful error is represented by the average signal only. This must be extracted from the overall signal. The ripple tends to be considered as noise. Unfortunately, the average value which is contained in the error signal is typically two orders of magnitudes smaller than the inherent ripple amplitude. Therefore, in the conventional apparatus, a low pass filter is usually employed to remove all undesirable harmonics from the overall signal. Due to the heavy filtering needed, the error signal generation and dynamic compensation of the servo loop results in a trade-off between a relatively slow response time with sufficient ripple filtering and decreased ripple filtering but faster response time.

Even though the trade-off capability exists with the utilization of the low pass filter, the ultimate design choice usually leads to the elimination of the 120 Hz first harmonic produced by the rectifier. Incidently, higher order subharmonics are additionally removed and the most significant effects of transient or spurious signals are removed necessarily because of the low pass filter action. One of the things desired in any kind of closed loop feedback system is relatively fast response time. It has been found that the VAR generator power delivering circuit, i.e. thyristors, capacitors, and inductors, has an inherent transport lag which is generally difficult to improve. The calculating time, however, is a function of the switching or control circuit, and that is improvable. It would be desirous, therefore, if the control portion or switching portion of the VAR generator feedback system could be speeded up. In so doing, it has been determined that the low pass filter is a prime candidate for removal. However, if the low pass filter is removed, the 120 Hz harmonic as well as all subharmonics and transient and noise signals will not be removed. This has a tendency to cause an erroneous feedback signal which will lead to under or over compensation with regard to the desirable range of voltage regulation and flicker control. It will be desirable, therefore, to find some way of removing the harmonics of the 60 Hz signal without the utilization of low pass filters. Finally, it has been found that a fixed voltage reference signal is usually necessary as part of the voltage feedback control. However, if a fixed voltage reference is utilized, it will cause the power circuit portion of the reactor VAR generator to provide compensating power for relatively slow voltage variations. The relatively slow voltage variations as mentioned previously are often not considered a serious problem. However, if compensation is provided by the VAR generator to remove them, a significant increase in the size or capacity of the VAR generator is required, that is, the VAR capacity must be greater than if flicker control only is desired. It would be advantageous therefore, if an adaptive voltage reference signal could be utilized which essentially allowed the switching portion of the feedback network to ignore relatively slow changes in voltage but to supply appropriate feedback control where the frequency of change is in the range in which it is desired to control flicker or provide some other form of voltage regulation. It would be further advantageous if the utilization of the adaptive voltage reference signal could be implemented in such a way as to eliminate the spiking problem often associated with certain types of voltage feedback control systems.

SUMMARY OF THE INVENTION

In accordance with the invention, apparatus is taught which uses a simulated light bulb as a form of feedback voltage control. This system is especially suited for but not limited to applications as a feedback signal for visible light flicker. The simulated light bulb voltage signal control utilizes an analog squaring module to square the voltage signal between any two lines for example, of the system to be regulated. Presuming that the voltage signal to be regulated is sinusoidal, the square thereof will contain a signal level which varies in correspondence with the deviation from the nominal magnitude of the voltage to be regulated. It will also contain a second harmonic signal which is undesirable. A notch filter is utilized to remove the undesirable second harmonic component signal. The remaining signal is supplied to the compensation calculator and reactive power generator for causing appropriate voltage regulation. Spurious transients, noise or higher order non-flicker causing oscillations on the line to be regulated will contribute to the production of a non-accurate slowly varying DC error signal is these signals are not eliminated. A filterless preconditioner which uses phase-to-phase interconnection and cancelling apparatus to remove some of the higher order harmonics and transient noise signals is utilized for accomplishing this purpose. Furthermore, an adaptive reference signal which tracks relatively slow variations in the line to be regulated to thus cause no error signal to be generated for a certain range of low frequencies but which becomes fixed for relatively higher frequencies at which flicker control and load regulation is most desired is also provided.

BRIEF DESCRIPTION OF THE DRAWINGS

For a better understanding of the invention, reference may be had to the preferred embodiment thereof shown in the accompanying drawings, in which.

DESCRIPTION OF THE PREFERRED EMBODIMENTS

Figure 1:
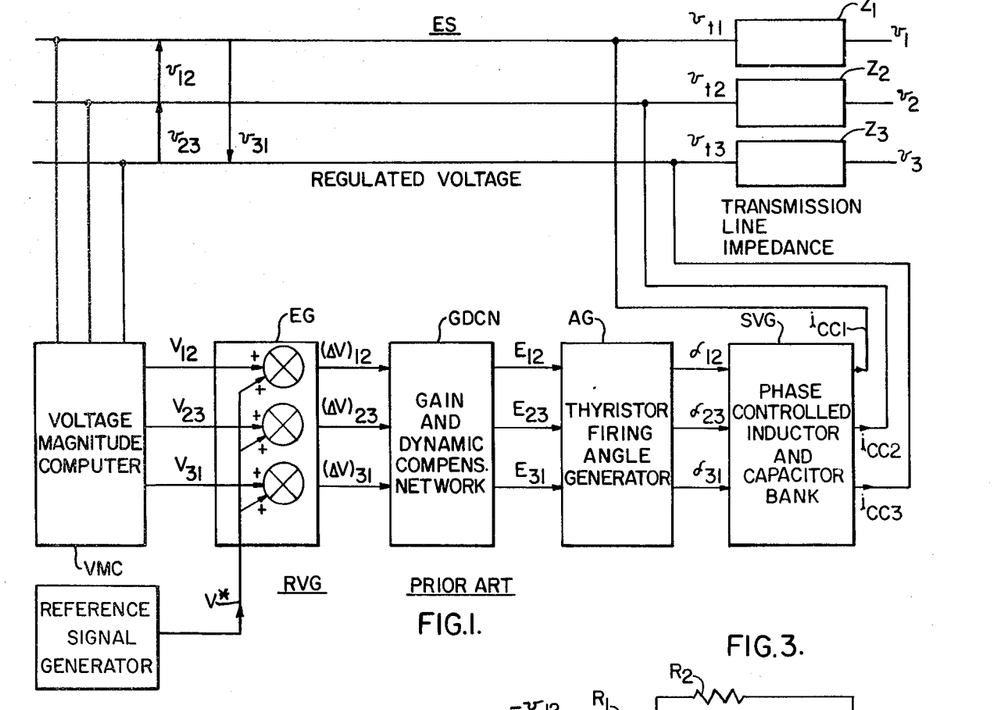
FIG. 1 shows a prior art voltage feedback closed loop regulator.

Referring now to the drawings and FIG. 1 in particular, an example of a prior art AC voltage regulating apparatus is shown. The required compensating currents $i_{CC1}$, $i_{CC2}$ and $i_{CC3}$ represent the difference between a common DC reference signal voltage $V^*$ as may be provided by a reference signal generator RSG and the measured magnitudes $V_{12}$, $V_{23}$, and $V_{31}$ of the line-to-line voltages $v_{12}$, $v_{23}$, and $v_{31}$ respectively. Generally, the power lines of an electrical system ES, for example, are regulated by the regulator or VAR generator RVG. The power system ES may comprise a three-phase or multi-phase electrical system of the Y or $\Delta$ type. In the prior art of FIG. 1, the line to neutral or line to ground voltages, as the case may be, $v_{t1}$, $v_{t2}$, and $v_{t3}$ are shown. In addition, the transmission line impedances Z1, Z2, and Z3 are represented by appropriate blocks. The three-phase line voltages $v_{12}$, $v_{23}$, and $v_{31}$ are measured or monitored by a voltage magnitude computer VMC which provides output signals $V_{12}$, $V_{23}$, and $V_{31}$, respectively which in turn are supplied to an error generator EG where the latter signals are compared against the DC reference voltage $V^*$ to provide error signals $(\Delta V)_{12}$, $(\Delta V)_{23}$, and $(\Delta V)_{31}$, respectively. These latter signals are provided to a Gain And Dynamic Compensation Network GDCN from where compensation signals $E_{12}$, $E_{23}$, and $E_{31}$ are provided to a Thyristor Firing Angle Generator or similar device AG. In the particular prior art embodiment shown in FIG. 1, phase control signals $\alpha_{12}$, $\alpha_{23}$, and $\alpha_{31}$ are generated by the thyristor firing angle generator AG for control of the Phase Controlled Inductor And Capacitor Bank SVG.

The Phase Controlled Inductor And Capacitor Bank SVG may be of the kind disclosed in previously mentioned U.S. Pat. No. 3,999,117. The Phase Controlled Inductor And Capacitor Bank SVG provides the previously mentioned compensating currents $i_{CC1}$, $i_{CC2}$, and $i_{CC3}$ to the power system ES for regulation of the voltages $v_{12}$, $v_{23}$, and $v_{31}$ or $v_{t1}$, $v_{t2}$, and $v_{t3}$ as the case may require.

Sometimes it is convenient to think of the line-to-line voltages $v_{12}$, $v_{23}$, $v_{31}$ as carrier waves which are modulated by a fluctuation waveform of arbitrary amplitude and frequency. The fluctuation represents the amount of deregulation and is a factor to be corrected by the regulator RVG. It has been found that the particular fluctuations can be extracted from the AC line voltages if the reference signal $V^*$ representing the magnitude of the carrier waveform is subtracted from the measured magnitude of the modulated waveform. Furthermore, since the fluctuation of a controlled system is called error in control terminology, the error generator EG is provided. The error signal contains the difference between the fixed DC reference voltage and the magnitude of the line-to-line voltage in each case. Each error signal is thereafter processed by the separate Gain And Dynamic Compensation Network GDCN which may contain proportional, integrating and derivitive networks to optimize the servo loop to the desired stability. If the electrical system ES is connected to a wildly or rapidly varying load (not shown), such as an electrical arc furnace, the variations in the line-to-line voltages $v_{12}$, $v_{23}$, and $v_{31}$ may be wild and frequent. It is not unusual in such a case to utilize the voltage regulator as a flicker compensator in which halfwave to halfwave voltage correction is required and produced. In the prior art, the conventional way of obtaining the error of the AC voltage signal is by utilizing a fullwave rectifier and then providing subtraction of the rectified signal from the DC reference signal $V^*$. The resulting error signal $\Delta V$ consists of an average value and a superimposed rectifier ripple which contains harmonics in a well-known composition. The useful error signal is represented only by the average signal. This must be extracted from the overall signal. The ripple is simply considered as noise or unuseful information. The average value of the error signal is typically two orders of magnitude smaller than the ripple amplitude. Therefore, in the prior art, a low pass filter is usually employed to remove undesirable harmonics from the overall signal. The error signal is then amplified and processed through another time dependent compensation network for servo loop stability. However, due to the heavy filtering required, the error signal generation and dynamic compensation results in either a relatively slow response time when sufficient filtering is present, or a faster response time but a less stable control loop with decreased filtering. In the latter case, under certain dynamic AC network conditions, the feedback system may tend to lock on insufficiently filtered harmonics which may remain in the error signal. This locked-on condition may persist for a considerable length of time. In some cases, it may even result in a phenomenon known as half waving, where the positive and negative cycles of a required, symmetrical, thyristor controlled inductor current become different and thus an unwanted DC current is supplied to the AC network.

It has been found that when the voltage regulator is to be used as a flicker compensator or light flicker control device such as is often needed when the electrical system is interconnected with an arc furnace, it is not practical to use a constant voltage reference signal $V^*$. It has been found that daily relatively slow variations of voltage level which may amount to several times larger values than what is considered as flicker are usually allowed on a power transmission line. A conventional regulator or VAR generator control with a constant voltage reference could not distinguish between the relatively slow daily fluctuation and the flicker fluctuations, and consequently a much, much larger capacity would be required in the static VAR generator SVG than would be required merely to correct for flicker as will be discussed hereinafter. One way to solve this kind of problem is to provide an adaptive voltage reference $V^{**}$ which will replace the constant voltage reference $V^*$. An adaptive voltage reference can be implemented by AC coupling of the voltage magnitude computer VMC with a relatively large time constant high pass filter. Unfortunately such an adaptive reference technique tends to cause spiking in a conventional control circuit. Spiking appears when the VAR generator runs out of compensating current due to the existence of larger than rated voltage fluctuations. Handling the spiking which is usually associated with the previously described saturation of the VAR generator, is very much a problem of practicality. The reason for this is that VAR generators are typically made to have as small a capacity as possible for a given range of amplitude of fluctuation. This of course has a tendency to save cost. The undesirable spiking will occur when the VAR generator comes back from saturation after trying to compensate for an excessive voltage fluctuation. This of course involves needless counteraction by the conventional linear integral VAR generator control which tends to compensate for events already past. During spiking immediately following an excessive fluctuation, the VAR generator itself tends to force a large unwanted voltage spike on the power network. The spike appears with opposite polarity to the previous excessive voltage fluctuation. Consequently, controls with fixed and adaptive references which do not induce spiking will be disclosed herein. It has also been found that with the phase controlled inductor type VAR generators, transport lag exists. The transport lag is an inherent feature of the VAR generator power circuit SVG, and is generally not correctable therein. However, lag in the non-linear feedback loop can be corrected.

Figure 2:
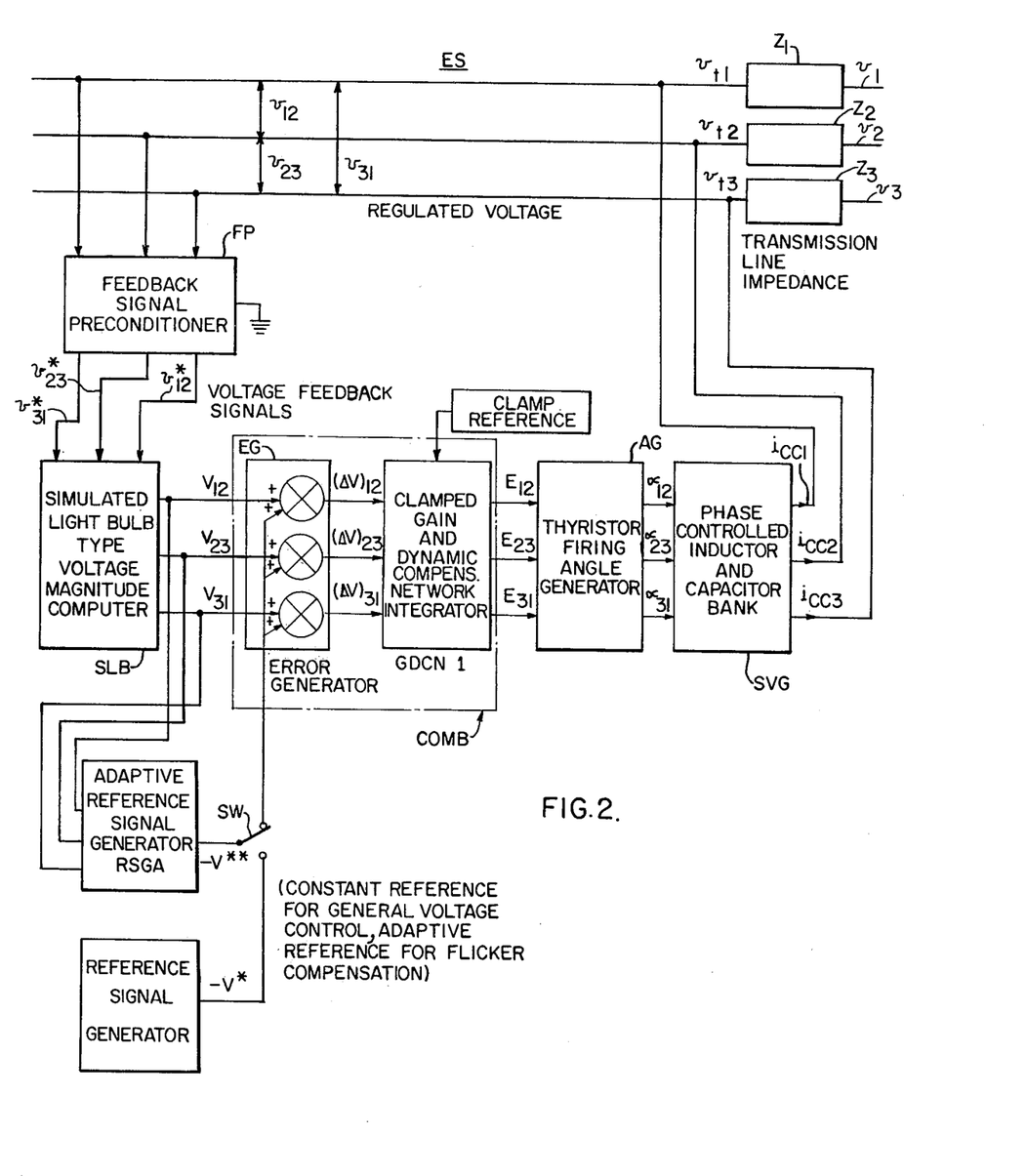
FIG. 2 shows a voltage feedback regulator with novel concepts.

Referring now to FIG. 2, a novel voltage feedback regulating system is shown. In this case, a feedback signal preconditioner FP is introduced into the loop. The feedback signal conditioner FP senses the line-to-line voltages $v_{12}$, $v_{23}$, and $v_{31}$ and provides preconditioned representative voltages $v_{12}^*$, $v_{23}^*$, and $v_{31}^*$ which in turn are supplied to a simulated light bulb type voltage magnitude computer SLB. The resultant amplitude signals $V_{12}$, $V_{23}$, and $V_{31}$ are then provided to the error generator EG, where they are compared with either a fixed voltage reference signal $V^*$ or an adaptive voltage reference signal $V^{}$. The adaptive voltage reference signal $V^{}$ comes from the adaptive reference signal generator RSGA. The input to the adaptive reference signal generator comes from the line to be controlled so that the voltages $V_{12}$, $V_{23}$, and $V_{31}$ are measured thereby. The error output signals $(\Delta V)_{12}$, $(\Delta V)_{23}$, and $(\Delta V)_{31}$ may be supplied to a Clamped Gain And Dynamic Compensation Network GDCN1. From here the signals $E_{12}$, $E_{23}$, $E_{31}$ are provided to the Thyristor Firing Angle Generator AG where the phase back signals $\alpha_{12}$, $\alpha_{23}$, and $\alpha_{31}$ are then produced and provided to the Phase Controlled Inductor And Capacitor Bank SVG where the previously mentioned compensating currents $i_{CC1}$, $i_{CC2}$, and $i_{CC3}$ are provided for the electrical system for regulating purposes.

The simulated light bulb type voltage magnitude computer SLB is based on the assumption that if the visible luminosity or brightness of a light bulb is kept constant by some control means, then the AC voltage supplying the light bulb is also constant. In other words, an AC voltage control which achieves constant brightness of a light bulb automatically regulates the sinusoidal or quasi-sinusoidal AC voltage across the bulb. However the following assumptions or constraints have been made: First, the resistance of the bulb filament is nearly constant. Second, the filament represents a resistive load for the power line. And third, the relationship between brightness and heat developed in the filament is sufficiently linear within the voltage fluctuation magnitude of interest. The first two assumptions have been validated. The third assumption is justified empirically. It has been found that by varying the AC voltage across a light bulb within selected fluctuation limits and by taking a plot of the average light meter output with respect to the voltage amplitude, that the otherwise non-linear relationship of voltage versus luminosity can be determined to be linear within a few percent over a relatively small region. This region is therefore utilized for control purposes.

A close look at the operational mechanism of the light bulb reveals that the light bulb acts as a multiplier when it is used as a voltage fluctuation detector. According to the third assumption, the heat in the filament of a light bulb has a closely linear relationship with the light emitted by the bulb. When a current, i, passes through a linear resistance with the value R, the heat that is generated during the duration of one cycle (1/f) is:

$$\text{heat} = \underbrace{\int_0^{1/f} Ri^2 dt}_{\text{heat generated during } dt} = \int_0^{1/f} \frac{v^2}{R} dt \qquad (1)$$

Because of the assumed closely linear relationship between voltage and current in the filament, the heat generated by the current i can also be expressed in terms of voltage and resistance, as shown in the rightmost portion of the Equation (1). The result of this shows that it is not necessary to use a somewhat cumbersome actual light bulb to measure voltage fluctuation, because the bulb's brightness can be truthfully simulated by a properly chosen exponential voltage signal. This leads to the idea of a simulated light bulb type voltage magnitude computer. By accepting the idea of utilizing a simulated ideal light bulb to measure and thereby control AC voltage magnitude, the simplicity of the flicker control can be maintained while increasing effectiveness.

According to the right side of Equation (1) the only variable in the equation is voltage v, which has to be squared, then scaled by the constant 1/R under the integral. Although the heat equation shown in (1) is not limited to sinusoidal voltages, such will be presumed for the convenience of illustration in the present embodiment. A wellknown trigonometric function for the square of a sinusoidal function is as follows:

$$\sin^2 \omega t = \tfrac{1}{2}(1 - \cos 2\omega t) \qquad (2)$$

Equation (2) consists of a DC value equal to the half value of the amplitude of the sin $\omega t$ and also a half amplitude AC component alternating at twice the original angular frequency $\omega$. This has been observed in the empirical measurement of voltage versus light output. However, because of a non-zero thermal time constant for the filament, the temperature and therefore the instantaneous light output of the actual filament is somewhat lagging behind the squared voltage waveform. This is because the thermal time constant of the filament acts similar to an electrical RC filter which shifts the phase and reduces the amplitude of the varying signal, which in this case is the signal $v^2_{12}$. In a simulated light bulb where fast operation is a primary requirement, fast operation can be obtained.

Figure 4:
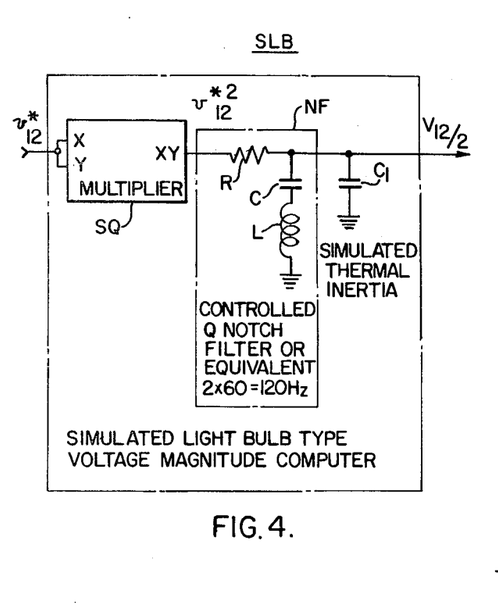
FIG. 4 shows an embodiment of a simulated light bulb type voltage magnitude computer such as is shown in FIG. 2.

Referring now to FIG. 4, an analog computer which represents the simulated light bulb is shown. The computer's input is the unity amplitude normalized AC line voltage $v^*_{12}$ indicated by Equation (3) below:

$$v_{12}^* = \frac{1}{\frac{1}{\sqrt{2}} V_{NOM}} v_{12} = V_{12} \sin \omega t \qquad (3)$$

Note that for purposes of convenience of illustration, only the operation on one voltage phase (1–2) rather than all three will be illustrated. It is to be understood that the operation with respect to the other three-phase voltages or multi-phase voltages is similar.

In Equation (3) $V_{NOM}$ is the nominal rms value of the selected AC line voltage to be regulated. $V_{12}$ is the nominal amplitude of the normalized voltage with unity value chosen for convenience. $v^*_{12}$ is fed to a squaring module, SQ, (in this case shown as an analog multiplier). The output signal of the squaring module becomes $v^{*2}_{12}$. Unfortunately the squaring produces an undesirable second harmonic in $v^{*2}_{12}$ but this can be conveniently removed by routing the latter signal through an RCL notch filter NF as shown in FIG. 4. The combination of the elements in the notch filter acts as a controlled quality factor-notch-filter, tuned to the second harmonic of the line voltage. In a preferred embodiment of the invention, the second harmonic equals 120 Hz. Controlled quality or Q means that the resistive element R of the filter will be selected in order to avoid excessive ringing while simultaneously providing an optimally minimum settling time for the output signal of the RCL filter. Simulated thermal inertia of the light bulb is represented by the capacitor $C_1$. Capacitor $C_1$ forms an simple RC filter by sharing resistor R with the LC filter. The output signal of the non-flickering simulated light bulb is therefore a DC signal value $V_{12}/2$. Since the line flicker represents a variation of this value, it (flicker information) must be contained in the output signal. By having the necessary information, the output signal can continuously update the voltage error signal and control the latest firing requirement for the thyristors of the static VAR generator SVG throughout the firing interval in each case.

The voltage sensitivity or gain of the simulated light bulb must be known, because it is included in the overall gain of the feedback control loop. In order to obtain a mathematical expression for this gain, increase the input voltage to the simulated light bulb by a small (e.g. less than 10%) normalized voltage step $\Delta V$. In this way the input signal becomes: $(1+\Delta V) \cdot v^*_{12}$. This step represents a normalized step—voltage fluctuation of identical magnitude in the regulated AC voltage, that is: $(1+\Delta V) v_{12}$. The gain of the simulated light bulb is defined as the ratio of the amplitudes of its output and input signals. At the multiplier output we obtain the following signal:

$$[(1+(\Delta V))v^*_{12}]^2 = [(1+(\Delta V))V_{12} \sin \omega t]^2 = (1+2(\Delta V)+(\Delta V)^2) \times \tfrac{1}{2} V^2_{12}(1-\cos 2\omega t) \qquad (4)$$

when $V_{12}=1$.

After removing the alternating ($-\cos 2\omega t$) component (by the notch filter NF) and noting that $V_{12}$ is unity, the DC output signal becomes:

$$\text{OUTPUT} = \tfrac{1}{2} V_{12} + V_{12}(\Delta V) + \tfrac{1}{2} V_{12}(\Delta V)^2 \qquad (5)$$

$(\Delta V)^2$ is a small ($< \pm 1\%$ at $\pm 10\%$ fluctuation) second order signal and can be taken as zero in a practical control:

$$\tfrac{1}{2} V_{12}(\Delta V)^2 = 0 \qquad (6)$$

The gains for the power line fundamental and the fluctuation amplitudes are not identical. The coefficient of input amplitudes $(1+\Delta V)$ represent the power line (voltage) and the fluctuation amplitudes respectively. The output of the simplified simulated light bulb is:

$$\tfrac{1}{2}V_{12}+V_{12}(\Delta V) \tag{7}$$

representing the same respective values. Therefore, it can be concluded that the gain for fluctuation is equal to unity:

$$G_F = \frac{V_{12}(\Delta V)_{OUT}}{V_{12}(\Delta V)_{IN}} = 1 \tag{8}$$

Figure 3:
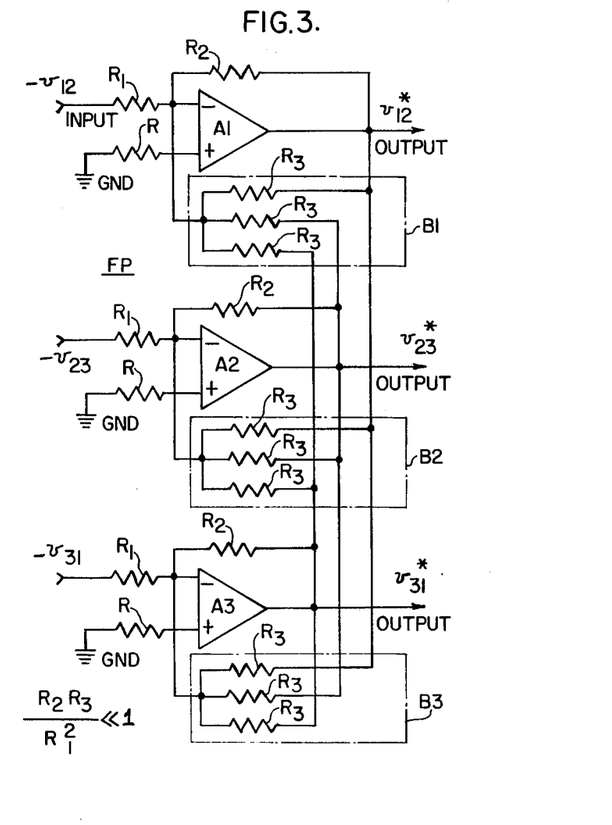
FIG. 3 shows an embodiment of the feedback signal conditioner of FIG. 2.

Referring now to FIG. 3, a filterless preconditioner FP for the voltage feedback signal is shown. Since cumbersome filters (with the exception of the notch filter NF of course) are left out of the simulated light bulb SLB of FIGS. 2 and 4, higher order harmonics or spurious noise from the line to be regulated are not inherently filtered out as is the case in the prior art. Therefore, these signals may appear as undesired ripple at the input of the thyristor firing angle generator AG in FIG. 2. This of course interferes with the generation of the proper real time firing pulses $\alpha_{12}$, $\alpha_{23}$, and $\alpha_{31}$ for the thyristor gates. Therefore, a feedback signal preconditioner which is basically filterless but nevertheless eliminates some of the previously described higher order harmonics noise signals is provided as is shown in FIG. 3. Basically, the three line voltages $v_{12}$, $v_{23}$, and $v_{31}$ are provided as inputs to feedback operational amplifier circuits A1, A2, and A3. The outputs of these circuits in turn are cross-fed and fed back by way of the feedback modules B1, B2, and B3 to the summing junction of the integrator amplifiers A1, A2, and A3. The preconditioner FP has no storage (L or C) element, and therefore does not impair fast sensing of the voltage magnitudes. The cross-coupling feedback technique works because aside from the natural line voltage harmonics, the preconditioner reduces the effects of some odd harmonics on the magnitude calculations which are to be generated therefrom. Certain harmonic voltages are short circuited between phases through the feedback paths. This technique is known as harmonic trapping. The harmonic trap can be implemented by obtaining the feedback signals from the Δ windings of the theoretical Y to Δ transformer connection where the relative impedance of the Y and Δ windings approach infinity. In spite of the fact that most VAR generator power circuits are connected to power transformers in a Y to Δ connection, the VAR generator and also the voltage sensing are usually connected to the Y section of the power transformer for the convenience of capacitor bank protection. Since the desired preconditioned voltages are the ones available at the Δ output, the power transformers do not tend to perform the required signal conditioning. Even if the connection of the power transformers were suitable in a particular voltage flicker compensator, the required large impedance ratio of the windings is still not available. Therefore, only the separate preconditioning of voltage feedback signals will be effective irrespective of power system connections. In the version of the preconditioner circuit shown in FIG. 3, the gain of each amplifier A1, A2, and A3 is identical and is determined by the well-known feedback-to-input resistor ratio R2/R1. The operation of the preconditioner attenuates the third harmonic component of the input voltage. As is well known, individual phase third harmonic components tend to add in otherwise symmetrical three-phase systems. Therefore, when this particular harmonic is present, the sum of the three voltages will not be zero. The filterless preconditioner FP of FIG. 3 utilized this phenomena. The zero sum condition of all three feedback signals is monitored and any deviation from it is eliminated by adding exactly the same but opposite polarity signal. This occurs while the signals are routed through a fast and large gain closed loop control represented by the respective operational amplifier. Since each inverting summing amplifier works with its non-inverting input at virtual ground, the inverting inputs can be shared with the respective cross-coupling networks acting as for example, third harmonic current generators. At each amplifier, any current including the one from the harmonic current generator which enters the summing junction will effect the output voltage in proportion to its respective magnitude and polarity. Since each current generator basically monitors the zero sum of three inverted line voltages, the polarity of the harmonic neutralizing current is supplied to the summing junctions of the amplifier properly. The quality of neutralization is determined by the relative gains of the operational inverters where gain is described as R2/R1, and of the current generators were gain is described as R1/R3. This works best when the product of R2 and R3 is significantly smaller than $R1^2$.

Figure 5:
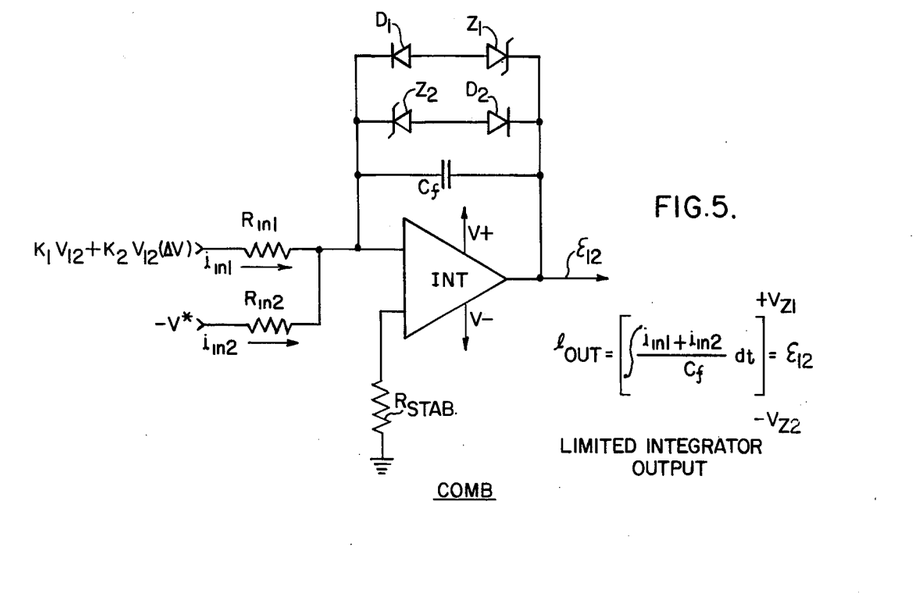
FIG. 5 shows a combination error generator and clamped gain and dynamic compensation network.

Refer now to FIG. 5. As was pointed out previously there are spiking problems associated with voltage controls containing an integrating control element. The problem lies in the fact that, when the VAR generator runs out of compensating power, due to its limited VAR capacity, the voltage error integrator tends to assume incorrect charges. The drift of the integrator is due to the appearance of an uncontrolled voltage error occurring at the input of the integrator. The magnitude of the drift itself is a function of both the saturation error and the duration of the excessive voltage that cannot be handled due to the limited, already saturated VAR capacity. The integrator tends to drift upward until the instant when the voltage level returns to below the excessive (saturation) level. Since the integrator output is proportional to the VAR requirement, the VAR generator becomes locked in its previous saturated state until a voltage fluctuation of opposite polarity drives the drifted integrator back into its linear control region. While the integrator keeps recovering (the VAR generator being in saturation) any voltage fluctuation proceeds unopposed. In many cases, this results in voltage spikes of considerable magnitude. In the present invention, spiking may be eliminated by immediate clamping of the integrator whenever the VAR generator saturates. In the exemplary case, when the gain and dynamic compensation network GDNC of FIG. 1 is limited to purely integrating action, the application of fixed output voltage clamps on the integrator are sufficient. If this is not the case, a tracking clamp should freeze the integrator while the VAR generator is saturated. The clamps shuld correspond to the zero and maximum VAR's capable of being supplied. The proposed clamps can be implemented simply by using Zener diodes as shown in FIG. 5 or by using other known feedback type clamp circuits. These clamps operate on the principle of feeding back identical but opposite amounts of current to the (inverting) input of the integrator INT which is charged via the input resistors of the integrator. The integrator amplifier has two input resistors $R_{in1}$ and $R_{in2}$ and performs as an integrator and error generator COMB simultaneously. $K_1$ and $K_2$ are constant scale factors, indicating the respective magnitudes of the steady state and fluctuation components of measured voltage. Diodes $D_1$ and $D_2$ are to prevent unwanted current paths when one of the Zener diodes $Z_1$ or $Z_2$ becomes forward biased within the linear operating region of the integrator. While the previously described clamps successfully eliminate spiking with the shown resistive ($R_{in1}$, $R_{in2}$) input network to the integrator or in the case of the shown fixed voltage reference $-V^*$, such clamping will not eliminate spiking with the adaptive voltage reference $-V^{}$. Adaptive voltage reference $V^{}$ is utilized for VAR generators operating predominantly as flicker compensators as opposed to applications for general voltage support of power transmission lines employing a fixed ($-V^*$) reference value. An adaptive integral control, which does not induce spiking after saturation can be approximated by a circuit based on using an integrator with differential input voltage capability. Such an integrator can be implemented by using an appropriate operational amplifier with differential input voltage capability. This feature of certain operational amplifiers is sometimes termed as the differential input voltage range. The range indicates the maximum safe value of voltage amplitude connected between the differential inputs of the amplifier.

With adaptive integral control implemented by simple AC coupling of the voltage magnitude, there are two kinds of undesired drifts which occur during saturation of the VAR generator. One is the drift of the integrator as previously described. The other drift occurs in the DC charge of the decoupling capacitor (not shown) representing the adaptive reference itself. If the adaptive reference $V^{**}$ is allowed to adapt to the excess phase voltage levels, it tends to induce spiking of its own, similarly to what happens with a drifted integrator. Both drifts must therefore be prevented simultaneously to minimize voltage fluctuations in a regulated power transmission network.

Figure 6:
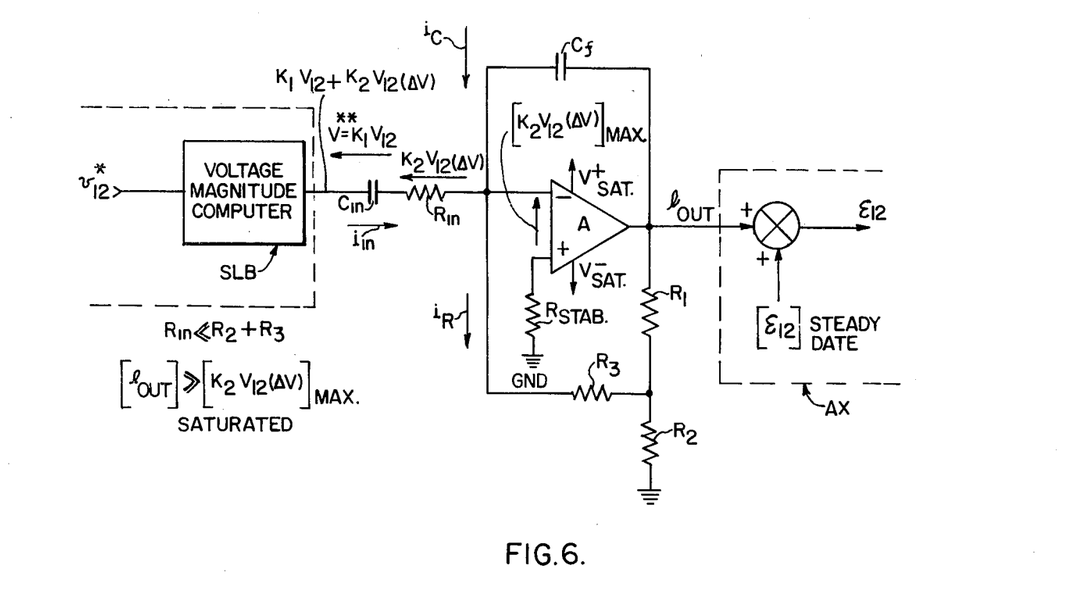
FIG. 6 shows another embodiment of an error generator and a clamped gain and dynamic compensation network.

Referring now to FIG. 6, a proposed adaptive integral control circuit is shown. It comprises an input capacitor $C_{in}$, an input resistor $R_{in}$, one feedback resistor (or three resistors equivalent to one, i.e. R1, R2, and R3), a feedback capacitor $C_f$, a drift stabilizing resistor $R_{STAB}$, and a operational amplifier A with differential voltage capability. $K_1$ and $K_2$ are constant coefficients of the selected voltage magnitude computer SLB, here equal to ½ and 1 for the respective absolute and fluctuation magnitudes. The power supply voltages to the operational amplifier are variable in order to provide adjustable positive and negative saturation levels of its output signal $I_{out}$, corresponding to the zero and full VAR outputs respectively. Once the amplifier saturation levels are established, they remain constant for the duration of the saturation of the VAR generator power output. The circuit should be designed to fulfill the following requirements:

$$R_{in} << R_2 + R_3 \quad (10)$$

and $$[I_{out}]_{SATURATED\ MIN} >> [k_2 V_{12}(\Delta V)]_{MAX} \quad (11)$$

(Minimums and maximums in the expected operating range). The value of $R_{STAB}$ is selected to satisfy the well known equal resistance requirement seen by the two inputs of the operational amplifier.

Implemented with the above restrictions, the circuit works in the following manner. In the absence of voltage fluctuations:

$$K_2 V_{12}(\Delta V) = 0 \quad (12)$$

$C_{in}$ is charged to the steady state value $K_2 V_{12}$. $C_f$ is charged to a value ($I_{out}$) which, in turn, maintains the proper VAR amount supplied by the VAR generator to support the assumed steady AC voltage envelope. With adaptive control it is possible to set any, including zero value of $I_{out}$ by relieving the integrator from supplying any steady state VAR requirement, $[\epsilon_{12}]_{STEADY\ STATE}$. $[\epsilon_{12}]_{STEADY\ STATE}$ can be supplied in an auxiliary circuit AX shown in dashed lines in the right of FIG. 6. In the auxiliary circuit AX, $I_{out}$ may simply be summed to the selected steady state VAR requirement $[\epsilon_{12}]_{STEADY\ STATE}$. With $I_{out}$ equal to zero in steady state, the control maintains the steady state voltage indefinitely. For very slow voltage variations, below what is considered the minimum fluctuation frequency, a small variation in $K_1 V_{12}$ results in a relatively small integrator input current $i_{in}$. $i_{in}$ tends to charge the feedback (integrating) capacitor $C_f$, which in turn, tends to discharge to zero through resistors $R_1$ and $R_3$ driving adaptive current $i_R$ across them. Due to the continual discharge of $C_f$, $I_{out}$ is maintained at near zero level. Therefore, a slow voltage variation does not tend to involve any significant change in the steady state reactive power supplied to the power transmission line. In order words, by not reacting to a slow voltage envelope for variations of the power transmission line, the voltage regulator has an adaptive voltage reference feature. For faster voltage variation, resulting in error signal $K_2 V_{12}(\Delta V)$ which, for the sake of the simplicity of explanation, does not have a DC component, the relatively large decoupling capacitor $C_{in}$ represents a near short circuit. $K_2 V_{12}(\Delta V)$ therefore appears across input resistor $R_{in}$. $R_{in}$ is terminated in the inverting input of the integrator amplifier which normally maintains a virtual ground at this point. The resulting input current $i_{in}$ flows almost entirely into $C_f$ because of the negligible shunt effect (adaptive current $i_R$) of the relatively high impedance resistive feedback circuit comprising resistors $R_1$, $R_2$, and $R_3$. Therefore, it can be said that under normal (unsaturated) conditions:

$$i_{in} = \frac{K_2 V_{12}(\Delta V)}{R_{in}} = \text{control current } i_c \quad (13)$$

(because $i_c >> i_R$). Both the AC fluctuation, $i_{in}$ and DC adaptive current $i_R$ flow through decoupling capacitor $C_{in}$. The adapted reference value is represented by the average charge or voltage, $K_2 V_{12}$, across capacitor $C_{in}$. A linear increase of the $I_{out}$ signal is due to the constant error $K_2 V_{12}(\Delta V)$ and the constant current $i_{in}$. If a positive error is selected in the control circuit to compensate for a positive fluctuation, then $I_{out}$ becomes saturated (constant) with negative polarity. At the same time, the VAR generator saturates in maintaining zero leading power to the transmission line. After the voltage regulation ceases and a voltage overshoot, exceeding the adapted level, develops in the control circuit of FIG. 6, a large error $K_2 V_{12}(\Delta V)$ develops. Normally a large error signal would result in large input $i_{in}$ and compensating feedback $i_c$ currents. Now, however, with one of its terminals clamped to a low impedance voltage source, $C_f$ switches itself into a high impedance path for any current $i_c$. Therefore, a large current $i_{in}$ cannot flow in this direction. A large current $i_{in}$ cannot flow through the path of current $i_R$ either, because of the original large designed value of resistance $R_3$. Since the impedance of the inverting input of the amplifier A is also very high, due to the differential input voltage capability of the selected amplifier, a virtual ground cannot be maintained any longer at the inverting input. From this time on the inverting input will have to support an increasing positive (for a positive excessive voltage) potential. According to condition (11), the relatively small excursion of the inverting input potential will result in a negligibly small capacitor current in both capacitors. We can also observe, that while a current proportional to the instantaneous large voltage error cannot flow through $C_{in}$, because of a voltage opposing this current is allowed to develop across the amplifier inputs, the longterm adaption is not impaired during saturation. This is because the small adaptive current $i_R$ can still flow during saturation. The main useful feature, however, is that in the meantime, the proposed circuit tends to refuse adaption to voltage overshoots during excessive voltage levels.

It is to be understood with respect to the embodiments of this invention that the simulated light bulb apparatus, the adaptive voltage reference apparatus, and the filterless preconditioner apparatus, are not limited to use with each other. It is also to be understood that the apparatus may be utilized for normal voltage regulation or for flicker control. It is also to be understood that the apparatus taught herein may be utilized on three-phase, multi-phase, or single-phase alternating current electrical systems of the Y or Δ variety, or of any other suitable variety.

The apparatus embodied in the teachings of this invention has many advantages. One advantage lies in the fact that a simulated light bulb may be utilized as part of a control circuit for a voltage regulator or flicker compensator. The simulated light bulb does not require the utilization of a low pass filter and is relatively effective while remaining fast in its operation. Another advantage lies in the fact that an adaptive voltage reference may be provided which at relatively low frequencies varies at approximately the same rate as the variation in the amplitude of the signals on the line to be regulated so as to produce a zero error signal which substantially allows low frequency variation to continue. The adaptive reference signal however, tends to become fixed at higher frequencies at which flicker and other problems occur so as to cause effective regulation of the electrical system to be controlled. Another advantage lies in the fact that filterless preconditioners may be used to cross-couple certain harmonics of line frequencies to thereby eliminate them before they are applied to the voltage magnitude calculator element of the closed loop control system. This may be done without the utilization of storage elements such as capacitors and filters so that increased frequency response or speed may be obtained even though a significant portion of irrelevant variation in voltage is prevented from continuing through the control loop where it would cause unnecessary or undesirable voltage correction.

What we claim is:

1. A voltage regulator for an electrical system, comprising:

determining means interconnected with said electrical system for detecting the voltage in said electrical system and for providing a determining means output signal which is related to the variation in said voltage;

error detector means interconnected with said determining means for comparing the variation in said voltage with a fixed reference signal in a predetermined frequency range to thus provide an output error signal which is proportional to the difference between the reference signal and the variation in said voltage, said reference signal however varying in substantially exact correspondence with said variation in the voltage of said electrical system in a second frequency range which is lower than said predetermined frequency range and thus provide a zero output signal for voltage variation in said second frequency range; and compensating means interconnected with said electrical system and said error detector means for providing regulation for said electrical system in correspondence with said error signal.

2. A voltage regulator for an AC electrical system in which a 60 Hz sinusoidal AC voltage wave of nominal amplitude is to be regulated, comprising:

determining means for determining the wave shape and the amplitude of said sinusoidal AC voltage wave and for providing a sinusoidal output wave which is generally proportional to said sinusoidal AC voltage wave;

analog squaring means interconnected with said determining means for squaring said sinusoidal output wave to produce a squaring means output signal, said squaring means output signal having a direct current component which is proportional within limits to the variation of the amplitude of said sinusoidal AC voltage wave from said nominal amplitude, said squaring means output signal also having a 120 Hz component;

compensating means interconnected with said determining means and said electrical system for providing compensating power to said electrical system for reducing the variation of said sinusoidal AC voltage wave from said nominal amplitudes, said compensating power being sinusoidal as a function of the variation of said direct current component of said squaring means output signal; and filter means provided between said analog squaring means and said compensating means to substantially prevent said 120 Hz component from reaching said compensating means.

3. The combination as claimed in claim 2 wherein low pass harmonic trap means is interposed between said AC electrical system and said determining means, said low pass harmonic trap means preventing electrical system frequency components in a frequency range—the lowest frequency of which begins at a significantly greater frequency than 60 Hz—from being applied to said determining means.

4. A VAR generator flicker compensator for an electrical system in which a voltage wave of nominal amplitude and nominal frequency is subjected to a range variations in amplitude, where the frequency of said amplitude variation lies within a predetermined range, comprising:

determining means for detecting the voltage wave shape of said amplitude varied voltage wave, said determining means providing an output wave which is proportional within limits to said amplitude varied voltage wave;

low pass filter means interposed between said electrical system and said determining means, said low pass filter means preventing electrical system frequency components in a frequency range the lowest frequency of which begins at a significantly greater frequency than said nominal frequency of said system voltage wave from being applied to said determining means;

analog squaring means interconnected with said determining means for squaring said output wave to provide a squaring means output signal, a direct current component of said squaring means output signal varying within limits in proportion to said variation in amplitude of said electrical system voltage wave relative to said nominal amplitude; and VAR generator compensating means interconnected with said determining means and said electrical system for providing compensating reactive power to said electrical system for reducing said variation in amplitude of said electrical system voltage relative to said nominal amplitude as a function of variation of said direct current component of said squaring means output signal.

5. A VAR generator flicker compensator for an electrical system in which a voltage wave of nominal amplitude and nominal frequency is subjected to a range of variations in amplitude, where the frequency of said amplitude variation lies within a predetermined range, comprising:

determining means for detecting the voltage wave shape of said amplitude varied voltage wave, said determining means providing an output wave which is proportional within limits to said amplitude varied voltage wave;

analog squaring means including notch filter means, wherein said analog squaring means is interconnected with said determining means for squaring said output wave to provide a squaring means output signal, said notch filter means substantially preventing the second harmonic of the nominal frequency of said system voltage wave from being part of said squaring means output signal, a direct current component of said squaring means output signal varying within limits in proportion to said variation in amplitude of said electrical system voltage wave relative to said nominal amplitude; and VAR generator compensating means interconnected with said determining means and said electrical system for providing compensating reactive power to said electrical system for reducing said variation in amplitude of said electrical system voltage relative to said nominal amplitude, this being done as a function of the variation of said direct current component of said squaring means amplitude.

6. A VAR generator flicker compensator for an electrical system in which a voltage wave of nominal amplitude and nominal frequency is subjected to a range of variations in amplitude, where the frequency of said amplitude variation lies within a predetermined range, comprising:

determining means for detecting the voltage wave shape of said amplitude varied voltage wave, said determining means providing an output wave which is proportional within limits to said amplitude varied voltage wave;

squaring means interconnected with said determining means for squaring the output wave thereof to thus provide a squaring means output signal, a direct current component of said squaring means output signal varying within limits in proportion to said variation in amplitude of said electrical system voltage wave relative to said nominal amplitude for frequencies above a relatively low range of frequencies;

error generator means interconnected with said squaring means for receiving said output wave therefrom, said error generating means comparing said direct current component of said squaring means output signal with a reference signal to produce an error signal as an output, said error signal thus generally varying as a function of said direct current component of said squaring means output signal, said reference signal varying in direct proportion to the variation of said component of said squaring means output signal in said relatively low range of frequencies so that said output signal of said error generator means is zero in this relatively low range of frequencies; and VAR generator compensating means interconnected with said determining means and said electrical system for providing compensating reactive power to said electrical system for reducing said variation in amplitude of said electrical system voltage wave relative to said nominal amplitude as a function of the variation of said direct current component of said squaring means output signal provided said variation in amplitude of said electrical system voltage is at frequency above said relatively low range of frequencies.

7. The combination as claimed in claim 6 wherein low pass filter means is interposed between said electrical system and said determining means, said low pass filter means preventing electrical system frequency components in a frequency range the lowest frequency of which begins at a significantly greater frequency than said nominal frequency of said system voltage wave— from being applied to said determining means.

8. The combination as claimed in claim 7 wherein notch means is interposed in said analog squaring means to substantially prevent the second harmonic of the nominal frequency of said system voltage wave from being applied to said VAR generator compensating means.

9. The combination as claimed in claim 8 wherein said nominal frequency of said system voltage wave is 60 Hz.

* * * * *